(12) United States Patent
Albers et al.

(10) Patent No.: US 6,932,567 B2
(45) Date of Patent: Aug. 23, 2005

(54) METHOD AND APPARATUS FOR CONTROLLING FLUID LEAKAGE THROUGH GAS TURBINE ENGINES

(75) Inventors: Robert Joseph Albers, Park Hills, KY (US); Marcia Jean Boyle, Lebanon, OH (US); Rafael Ruiz, Mason, OH (US)

(73) Assignee: General Electric Company, Schenectady, NY (US)

( * ) Notice: Subject to any disclaimer, the term of this patent is extended or adjusted under 35 U.S.C. 154(b) by 101 days.

(21) Appl. No.: 10/326,028

(22) Filed: Dec. 19, 2002

(65) Prior Publication Data

US 2004/0120807 A1 Jun. 24, 2004

(51) Int. Cl.$^7$ ................................. F01D 11/00
(52) U.S. Cl. ................... 415/174.2; 415/174.3; 415/173.3; 415/231; 277/358
(58) Field of Search ............... 415/174.2, 174.3, 415/173.3, 231, 113, 111, 171.1; 277/358, 377, 379

(56) References Cited

U.S. PATENT DOCUMENTS

| | | | |
|---|---|---|---|
| 3,383,033 A | | 5/1968 | Moore |
| 3,501,245 A | * | 3/1970 | Ivanko ................. 415/113 |
| 3,942,804 A | | 3/1976 | Andress et al. |
| 4,415,309 A | * | 11/1983 | Atterbury ............. 415/174.2 |
| 4,421,321 A | * | 12/1983 | Lipschitz ............. 277/424 |
| 4,447,062 A | | 5/1984 | Leicht |
| 5,076,591 A | | 12/1991 | Gentile |
| 5,143,384 A | * | 9/1992 | Lipschitz ............. 277/400 |
| 5,253,875 A | | 10/1993 | Gentile |
| 5,284,347 A | | 2/1994 | Pope |
| 5,355,909 A | | 10/1994 | Smith, III |
| 5,411,365 A | | 5/1995 | Mazzola et al. |
| 6,286,840 B1 | | 9/2001 | Zettel |
| 6,349,467 B1 | | 2/2002 | Karafillis et al. |

FOREIGN PATENT DOCUMENTS

| | | | |
|---|---|---|---|
| EP | 0 523 899 | | 1/1993 |
| GB | 1012085 | | 8/1965 |
| JP | 01147163 A | * | 6/1989 ........ F03B/11/00 |

* cited by examiner

Primary Examiner—Theresa Trieu
(74) Attorney, Agent, or Firm—William Scott Andes; Armstrong Teasdale LLP

(57) ABSTRACT

A method for controlling fluid leakage between a first pressure region and a second pressure region within a gas turbine engine using a first sealing member and a second sealing member. The first sealing member is movably coupled to a portion of the gas turbine engine, and a space defined generally between a portion of the first sealing member and a portion of the second sealing member fluidly couples the first pressure region to the second pressure region. The method includes moving the first sealing member towards the second sealing member using fluid pressure within a portion of the engine, and, using the first and second sealing members, substantially controlling fluid leakage between the first pressure area and the second pressure area through the space generally without contacting the first sealing member with the second sealing member.

19 Claims, 2 Drawing Sheets

METHOD AND APPARATUS FOR CONTROLLING FLUID LEAKAGE THROUGH GAS TURBINE ENGINES

BACKGROUND OF THE INVENTION

This invention relates generally to gas turbine engines, and more specifically to a method and apparatus for controlling fluid leakage through a gas turbine engine.

Gas turbine engines typically include a compressor for compressing air. The compressed air is mixed with a fuel and channeled to a combustor, wherein the fuel/air mixture is ignited within a combustion chamber to generate hot combustion gases. The combustion gasses are channeled to a turbine, which extracts energy from the combustion gases for powering the compressor, as well as producing useful work to propel an aircraft in flight or to power a load, such as an electrical generator.

Within at least some known gas turbine engines, fluid leakage through seals positioned within the engine may significantly increase fuel consumption, reduce engine efficiency, and, because of a resulting increase in turbine inlet temperature, may also increase maintenance costs for the engine. As is well known, high pressure gases, such as combustion gases within the turbine and compressor discharge air, may leak from higher pressure areas to areas of lower pressure. To facilitate controlling such leakage, at least some known gas turbine engines include labyrinth seals, and/or brush seals positioned between adjacent areas of high and low pressure. However, over time, continued exposure to high pressure and thermal cycling may cause labyrinth seals and brush seals to wear and lose their sealing effectiveness. As a result, labyrinth seals and brush seals may need to be periodically replaced, but to do so, requires the engine to be shut down.

To facilitate extending an amount of time elapsed between engine outages, at least some other known gas turbine engines include gas bearing type seals to facilitate controlling leakage of fluid between areas of generally high and low pressures. However, although such seals do not generally require replacement as frequently as labyrinth and brush seals, known gas bearing type seals are generally much more complex, and therefore their installation and manufacture may be much more time consuming, and expensive. Furthermore, overtime, although such seals generally tend to withstand wear better than labyrinth and brush seals, at least some know gas bearing type seals may vibrate undesirably during operation of the gas turbine engine.

BRIEF DESCRIPTION OF THE INVENTION

In one aspect, a method for assembling a seal assembly to facilitate controlling fluid leakage through a gas turbine engine is provided. The method comprises coupling a stationary member to the gas turbine engine between a first pressure region and a second pressure region that is at a lower pressure than the first pressure region and coupling a first sealing member to a portion of the stationary member. The method also comprises coupling a second sealing member to the gas turbine engine such that a gap defined between the first and second sealing members fluidly couples the first pressure region to the second pressure region, and such that during engine operation the first and second sealing members substantially control fluid leakage between the first and second pressure regions through the gap, without the first sealing member contacting the second sealing member.

In another aspect of the invention, a seal assembly is provided to facilitate controlling fluid leakage between a first pressure region and a second pressure region defined within a gas turbine engine. The assembly includes a stationary member fixedly coupled to a portion of the gas turbine engine, a first sealing member movably coupled to the stationary member, and a second sealing member coupled to the gas turbine engine such that a gap is defined generally between the first sealing member and a portion of the second sealing member. The first pressure region is fluidly coupled to the second pressure region through the gap. The first sealing member is configured to move toward the second sealing member under fluid pressure. The first and second sealing members are configured to substantially control fluid leakage between the first pressure region and the second pressure region through the gap such that the first sealing member does not contact the second sealing member.

In yet another aspect, a gas turbine engine is provided including a first pressure region, a second pressure region, a compressor, and at least one turbine assembly downstream from and in flow communication with the compressor. The turbine assembly includes at least one rotor coupled to a portion of the turbine assembly and is configured to rotate about an axis of rotation. The engine also includes a seal assembly including a stationary member fixedly coupled to a portion of the gas turbine engine, a first sealing member is coupled to the stationary member, such that a gap is defined between a portion of the first sealing member and a portion of the rotor. The first pressure region is fluidly coupled to the second pressure region through the gap. The first sealing member is movable towards the second sealing member under fluid pressure. The first and second sealing members are configured to substantially control fluid leakage between the first pressure region and the second pressure region through the space generally without contacting each other.

DETAILED DESCRIPTION OF THE INVENTION

Although the invention is herein described and illustrated in association with a compressor to turbine interface for a gas turbine engine, it should be understood that the present invention may be used for controlling leakage of any fluid between any generally high pressure area and any generally low pressure area within a gas turbine engine.

Figure 1:
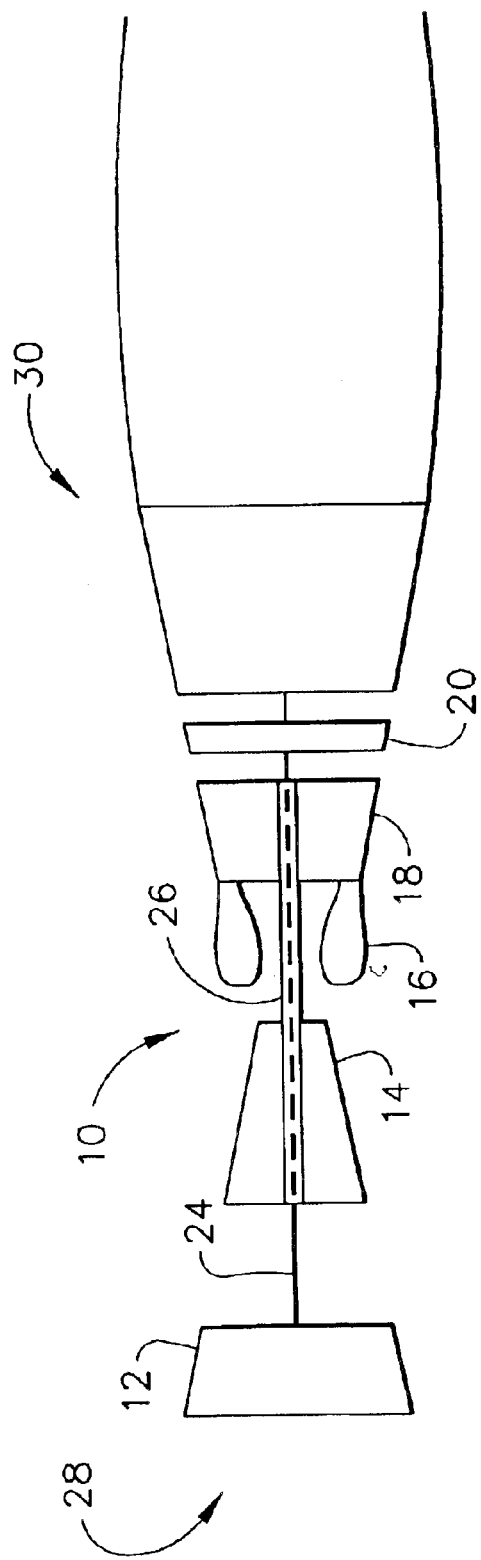
FIG. 1 is a schematic illustration of an exemplary gas turbine engine.

FIG. 1 is a schematic illustration of a gas turbine engine 10 including a low-pressure compressor 12, a high-pressure compressor 14, and a combustor 16. Engine 10 also includes a high-pressure turbine 18 and a low-pressure turbine 20. Compressor 12 and turbine 20 are coupled by a first shaft 24, and compressor 14 and turbine 18 are coupled by a second shaft 26. Engine 10 has an intake, or upstream, side 28 and an exhaust, or downstream, side 30. In one embodiment, engine 10 is a turbine engine commercially available from General Electric Aircraft Engines, Evendale, Ohio.

In operation, air flows through low-pressure compressor 12 and high-pressure compressor 14 to combustor 16, wherein the compressed air is mixed with a fuel and ignited to generate hot combustion gases. The combustion gases are discharged from combustor 16 into a turbine nozzle assembly (not shown in FIG. 1) that includes a plurality of nozzles (not shown in FIG. 1) and is used to drive turbines 18 and 20. Turbine 20, in turn, drives low-pressure compressor 12, and turbine 18 drives high-pressure compressor 14.

Figure 2:
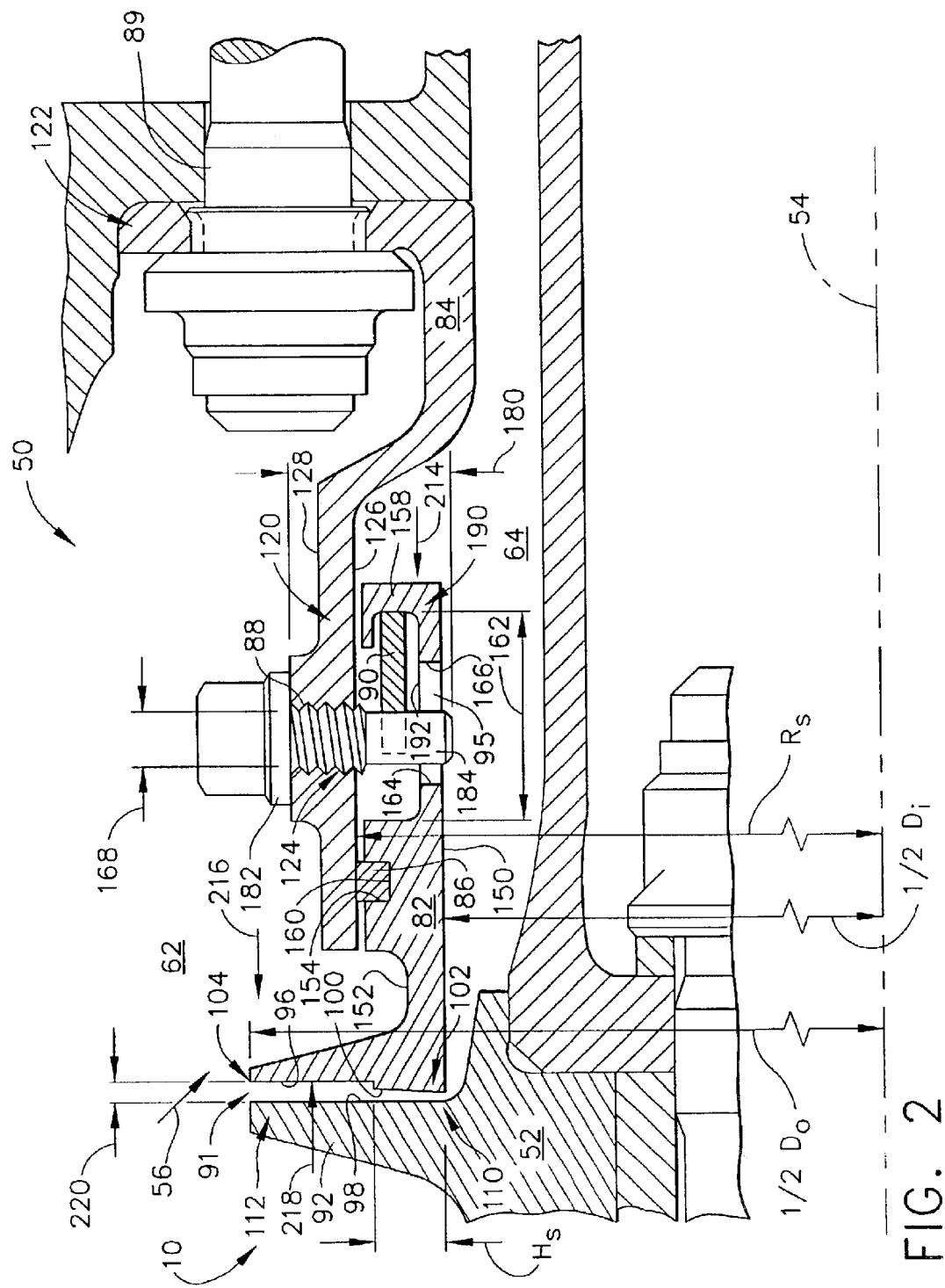
FIG. 2 is a cross-sectional view of an exemplary seal assembly that may be used with the gas turbine engine shown in FIG. 1.

FIG. 2 is a cross-sectional view of an exemplary seal assembly 50 that may be used with gas turbine engine 10. Turbines 18 and 20 (shown in FIG. 1) each include a rotor 52, which is rotatably coupled to engine 10 such that rotor 52 rotates about an axis of rotation 54. In the exemplary embodiment, rotor 52 is a compressor discharge seal pressure rotor. A plurality of turbine blades (not shown) are coupled to, and spaced circumferentially around, rotor 52. As described above, a portion of the highly compressed air discharged from high-pressure compressor 14 (shown in FIG. 1) is ignited with fuel within combustor 16 (shown in FIG. 1), and is channeled through the turbine blades. Torque generated by rotation of rotor 52 is transmitted through either shaft 24 (shown in FIG. 1) or shaft 26 (shown in FIG. 1) to power low-pressure compressor 12 or high-pressure compressor 14, respectively.

A portion of the highly compressed air 56 discharged from high pressure compressor 14 is directed towards seal assembly 50 for use as cooling fluid. Seal assembly 50 facilitates substantially controlling fluid flow from a region 62 of higher pressure to a region 64 of lower pressure. More specifically, in the exemplary embodiment, seal assembly 50 facilitates controlling leakage of high pressure air discharged from compressor 14 from region 62 to region 64.

Seal assembly 50 includes a sliding stator 82, a stationary seal member 84, a piston ring seal 86, at least one centering pin 88, and at least one biasing mechanism 90. Assembly 50 is coupled to engine 10 by a fastener 89 that extends through stationary member 84. Sliding stator 82 is referred to herein as a first sealing member and is coupled to engine 10 such that a divergent gap 91 is defined generally between stator 82 and a portion 92 of rotor 52. More specifically, gap 91 is defined between a forward face 96 of stator 82 and an outer surface 98 of rotor 52.

Sliding stator 82 includes at least one axial slot 95 that permits axial motion of stator 82 while centering is substantially maintained, as described in more detail below. Pressure regions 62 and 64 are coupled in flow communication through gap 91 when seal assembly 50 is in an 'open' position. More specifically, the seal assembly open position occurs when stator 82 is retracted away from rotor 52 along axis 54, as is described in more detail below. In one embodiment, sliding stator 82 also includes at least one opening (not shown) that extends through sliding stator 82 in flow communication with gap 91. The sliding stator opening facilitates maintaining an air bearing through gap 91 to facilitate preventing contact between sliding stator 82 and rotor portion 92.

In the exemplary embodiment, forward face 96 includes at least one step projection 100 such that a radially lower side 102 of face 96 is positioned closer to rotor outer surface 98 than a radially outer side 104 is positioned relative to surface 98. In an alternative, embodiment, forward face 96 is tapered and extends obliquely away from rotor surface 98 such that radially lower side 102 is positioned relatively closer to surface 98 than radially outer side 104 is positioned. In a further alternative embodiment, forward face 96 is substantially parallel to rotor surface 98, and rotor surface 98 includes a pair of projections (not shown) that extend from a radially inner side 110 and a radially outer side 112, respectively, from surface 98, such that the radially inner projection extends outwardly a longer distance than the radially outer projection, such that the projections facilitate controlling fluid flow through gap 91.

Stationary seal member 84 includes a first portion 120, a second portion 122, and at least one opening 124. First portion 120 includes a radially inner side 126 and a radially outer side 128. In one embodiment, first portion 120 extends substantially circumferentially around axis 54, and sides 126 and 128 are generally annular. In an alternative embodiment, a plurality of segmented stationary seal members 84 extend substantially circumferentially around axis 54. Opening 124 extends through first portion 120, and more specifically, through inner and outer sides 126 and 128, respectively. In one embodiment, opening 124 is generally cylindrically-shaped and stationary member first portion 120 includes a plurality of threads therein that enable connection to centering pin 88.

Second portion 122 extends outwardly from first portion 120 and is fixedly coupled, in the exemplary embodiment, within engine 10 by fastener 89. More specifically, second portion 122 is coupled to first portion 120 in any suitable manner. In the exemplary embodiment, second portion 122 is formed integrally with first portion 120. In an alternative embodiment, second portion 122 is a separate component that is fixedly coupled to first portion 120.

Sliding stator 82 is coupled to stationary seal member 84 such that sliding stator 82 is translatable along axis 54 with respect to stationary seal member 84 and rotor 52. Sliding stator 82 includes a radially inner side 150, a radially outer side 152, a groove 154, and an extension 158. In one embodiment, sliding stator 82 extends substantially circumferentially around axis 54, and inner and outer sides 150 and 152, respectively, are generally annular. In an alternative embodiment, a plurality of stators extend substantially circumferentially around axis 54. Groove 154 is defined within sliding stator first side 152 and extends circumferentially around axis 54 such that a radially outer surface 160 of groove 154 is generally annular. Piston ring seal 86 is disposed within groove 154 such that seal 86 substantially fills groove 154 and contacts stationary seal member 84. Seal 86 facilitates, as described in more detail below, substantially preventing fluid from leaking between areas 62 and 64, and more specifically leakage of high pressure compressor discharge air between stator 82 and stationary seal member 84.

Slot 95 is defined within stator 82 and enables movement of sliding stator 82 along axis 54, and with respect to rotor 52 and stationary seal member 84. More specifically, slot 95 extends completely through sliding stator 82, between stator inner and outer sides 150 and 152, respectively. Slot 95 has a length 162 that is measured between a first slot end 164 and a second slot end 166, and has a width (not shown) that is approximately equal to, or slightly wider than a diameter 168 of centering pin 88. Slot length 162 and the slot width facilitate aligning stator 82 with respect to rotor 52 and stationary seal member 84. Accordingly, pin 88 facilitates aligning stator 82 with respect to rotor 52 and stationary seal member 84. More specifically, the combination of pin 88 and slot 95 limit movement of sliding stator 82 along axis 54.

Pin 88 is coupled to stationary seal member 84 in any suitable manner, and extends a length 180 measured between a first end 182 and a second end 184. A portion of pin 88 adjacent first end 182 extends through opening 124, and a portion of pin 88 adjacent second end 184 extends through slot 95. In one embodiment, sliding stator 82 includes a plurality of slots 95, and stationary seal member 84 includes a plurality of pins 88, wherein each slot 95 includes a respective pin 88 extending therethrough.

Extension 158 extends outwardly from an end 190 of stator 82, and in the exemplary embodiment, extends substantially perpendicularly to a portion 192 of stator outer side 152. Biasing mechanism 90 biases sliding stator 82 away from rotor 52 along axis 54. In the exemplary embodiment, biasing mechanism 90 is coupled to extension 158 and pin 88. In one embodiment, biasing mechanism 90 is a leaf spring. In another embodiment, biasing mechanism 90 is a helical spring. In another embodiment, biasing member 90 is any biasing mechanism suitable for biasing stator 82 away from rotor 52 along axis 54.

When engine 10 is not operating, biasing mechanism 90 is preloaded such that seal assembly 50 is in the opened position such that stator 82 is retracted away from rotor 52 along axis 54. Furthermore, during an initial start-up of engine 10, an operating pressure within gap 91, is substantially equal to the pressure within areas 62 and 64. Accordingly, biasing mechanism 90 is preloaded when seal assembly 50 is in the open position.

As compressor 14 delivers highly compressed air to engine member passages 56, the operating pressure within pressure area 62 is increased, and a first force 216 is generated by the pressure within area 62 acting on adjacent surface areas of stator 82, and a second force 214 is generated by the pressure within area 64 acting on adjacent surface areas of stator 82. The combination of forces 214 and 216, acting in combination, overcome frictional forces induced between piston ring seal 86 and member 84, resistance force provided by biasing mechanism 90, an inertia force due to the weight of sliding stator 82, and a force 218 generated by pressure acting on adjacent surface areas of stator 82. Accordingly, sliding stator 82 moves along axis 54 towards rotor portion 92. In one embodiment, a starter tooth (not shown) extends radially outwardly across gap 91 from a radially outer side 104 of face 96 to facilitate creating an initial pressure drop. As sliding stator 82 moves along axis 54, an axial distance 220 defined between rotor surface 98 and stator surface 96 decreases, and an operating pressure within gap 91 increases, and as a result third force 218 also increases. When a combination of third force 218, induced friction between seal 86 and member 84, the inertia force due to the weight of sliding stator 82, and the resistance force generated by biasing mechanism 90 is substantially equal to a combination of first force 216 and second force 214, equilibrium is reached and stator 82 generally stops moving along axis 54.

By variably selecting an inner diameter $D_i$ of seal assembly 50, a radius $R_s$ of stationary member 84, a height $H_s$ of stepped surface 96, and/or an outer diameter $D_o$ of seal assembly 50, flow optimization through seal assembly 50 is facilitated. More specifically, altering the aforementioned dimensions enables control and adjustment of an equilibrium position of seal assembly 50, i.e., rotor/stator axial clearance. For example, adjusting the axial clearance to a small magnitude facilitates minimizing leakage through assembly 50. In contrast, the axial clearance can be adjusted to facilitate permitting a desired amount of flow through seal assembly 50 for cavity purge.

When equilibrium is reached, seal assembly 50 is in the 'closed' position, and seal assembly 50 substantially controls compressor discharge air leakage between areas 62 and 64. In addition, piston ring seal 86 substantially facilitates preventing compressor discharge air from leaking between areas 62 and 64. In the exemplary embodiment, stator surface 96 generally does not contact rotor portion 92, but rather is maintained an axial distance from portion 92 to facilitate controlling leakage between areas 62 and 64.

The above-described seal is cost-effective and highly reliable for facilitating controlling fluid leakage between areas of generally high pressure and areas of generally low pressure. More specifically, the seal facilitates controlling fluid leakage between areas of generally high pressure and areas of generally low pressure generally without contacting a gas turbine engine rotor. Accordingly, the above-described seal experiences less wear, and therefore performance of the seal may degrade less over time and the seal may have a longer operational life. As a result, the seal facilitates reducing the operating costs of some gas turbine engines in a cost-effective and reliable manner.

Exemplary embodiments of seal assemblies are described above in detail. The systems are not limited to the specific embodiments described herein, but rather, components of each assembly may be utilized independently and separately from other components described herein. Each seal assembly component can also be used in combination with other seal assembly components.

While the invention has been described in terms of various specific embodiments, those skilled in the art will recognize that the invention can be practiced with modification within the spirit and scope of the claims.

What is claimed is:

1. A method for assembling a seal assembly to facilitate controlling fluid leakage through a gas turbine engine, said method comprising coupling a stationary member to the gas turbine engine between a first pressure region and a second pressure region that is at a lower pressure than the first pressure region;

coupling a first sealing member to a portion of the stationary member;

coupling a second sealing member to the gas turbine engine such that a gap defined between the first and second sealing members fluidly couples the first pressure region to the second pressure region, and such that during engine operation the first and second sealing members substantially control fluid leakage between the first and second pressure regions through the gap, such that contact between the first sealing member and the second sealing member is facilitated to be prevented, and such that an opening extending through the first sealing member is positioned in flow communication with the gap.

2. A method in accordance with claim 1 wherein the second sealing member is a rotor, said coupling a second sealing member to the gas turbine engine further comprises coupling the rotor to a portion of the gas turbine engine such that as the rotor rotates about an axis of rotation, fluid pressure forces the first sealing member toward the rotor along the axis of rotation.

3. A method in accordance with claim 1 wherein the gas turbine engine includes at least one compressor, and the second sealing member is a turbine rotor that is coupled to a portion of the gas turbine engine such that the turbine rotor rotates about an axis of rotation, said coupling a second sealing member to the gas turbine engine further comprises coupling the rotor to a portion of the gas turbine engine to facilitate controlling air flow discharged by the compressor between the first and second pressure areas through the space.

4. A method in accordance with claim 1 further comprising orienting at least one of the first sealing member and the second sealing member such that the gap defined between the first and second sealing members is divergent.

5. A method in accordance with claim 1 wherein coupling a first sealing member to a portion of the stationary member further comprises coupling the first sealing member to the stationary member such that the first sealing member is movable towards the second sealing member with respect to the stationary member using fluid pressure.

6. A method in accordance with claim 1 further comprising coupling a third sealing member between the first sealing member and the stationary member to facilitate substantially controlling fluid leakage between the first sealing member and the stationary member.

7. A method in accordance with claim 1 wherein coupling a second sealing member to the gas turbine engine further comprises biasing the first sealing member away from the second sealing member using a biasing mechanism.

8. A seal assembly for controlling fluid leakage between a first pressure region and a second pressure region defined within a gas turbine engine, said seal assembly comprising:

a stationary member fixedly coupled to the gas turbine engine;

a first sealing member movably coupled to said stationary member; and a second sealing member coupled to the gas turbine engine such that a gap defined generally between said first sealing member and a portion of said second sealing member fluidly couples the first pressure region to the second pressure region, when subjected to fluid pressure, said first sealing member movable towards said second sealing member, one of said first and second sealing members comprises an opening extending therethrough and in flow communication with said gap, said first and second sealing members configured to substantially control fluid leakage between the first pressure region and the second pressure region through said gap such that contact between said first sealing member and said second sealing member is facilitated to be prevented.

9. A seal assembly in accordance with claim 8 wherein said second sealing member comprises a rotor coupled to the gas turbine engine, said first sealing member configured to move toward said rotor along an axis of rotation of said rotor.

10. A seal assembly in accordance with claim 8 wherein the gas turbine engine includes at least one compressor, said second sealing member comprising a turbine rotor coupled to the gas turbine engine, said first sealing member and said turbine rotor are configured to substantially control air flow discharged from the compressor between the first pressure region and the second pressure region through said gap.

11. A seal assembly in accordance with claim 8 wherein at least one of said first sealing member and said second sealing member comprises a stepped outer face that facilitates controlling fluid leakage between the first pressure area and the second pressure area through said gap.

12. A seal assembly in accordance with claim 8 wherein at least one of said first sealing member and said second sealing member is obliquely aligned with respect to the other respective sealing member, such that said gap is divergent.

13. A seal assembly in accordance with claim 8 further comprising a third sealing member coupled between said first sealing member and said stationary member, said third sealing member facilitates substantially preventing fluid from leaking between said first sealing member and said stationary member.

14. A seal assembly in accordance with claim 13 wherein said third sealing member comprises a piston ring seal, said first sealing member comprises a groove defined within a surface of said first sealing member, said piston ring seal disposed at least partially within said groove such that said piston ring seal contacts said stationary member.

15. A seal assembly in accordance with claim 8 further comprising a biasing mechanism coupled to said first sealing member for biasing said first sealing member away from said second sealing member by said biasing mechanism.

16. A gas turbine engine comprising:

a first pressure region;

a second pressure region;

a compressor;

at least one turbine assembly downstream from and in flow communication with said compressor, said turbine assembly comprising at least one rotor coupled to a portion of said turbine assembly; and a seal assembly comprising a stationary member, a first sealing member, and a second sealing member, said stationary member coupled to said gas turbine engine, said first sealing member movably coupled to said stationary member such that a gap is defined generally between said first sealing member and a portion of said rotor, one of said first sealing member and said second sealing member comprises an opening extending therethrough and in flow communication with said gap, said first pressure region fluidly coupled to said second pressure region through said gap, said first sealing member movable under fluid pressure along an axis of rotation of said rotor towards said second sealing member, said first and second sealing members configured to substantially control fluid leakage between said first pressure region and said second pressure region through said gap.

17. A gas turbine engine in accordance with claim 16 wherein at least one of said first sealing member and said rotor comprises a stepped outer face that facilitates substantially controlling fluid leakage between said first pressure area and said second pressure area through said gap.

18. A gas turbine engine in accordance with claim 17 further comprising a biasing mechanism extending between said first sealing member and at least a portion of said stationary member, said biasing mechanism for biasing said first sealing member away from said rotor.

19. A gas turbine engine in accordance with claim 16 further comprising a third sealing member positioned between said first sealing member and said stationary member to facilitate substantially preventing leakage between said first sealing member and said stationary member.

* * * * *